United States Patent
Lin (10) Patent No.: US 11,289,287 B2
(45) Date of Patent: Mar. 29, 2022

(54) DETACHABLE SCREEN KEY STRUCTURE

(71) Applicant: Yi-Ting Lin, New Taipei (TW)

(72) Inventor: Yi-Ting Lin, New Taipei (TW)

( * ) Notice: Subject to any disclaimer, the term of this patent is extended or adjusted under 35 U.S.C. 154(b) by 224 days.

(21) Appl. No.: 16/711,427

(22) Filed: Dec. 12, 2019

(65) Prior Publication Data

US 2021/0183594 A1 Jun. 17, 2021

(51) Int. Cl.
*H01H 13/83* (2006.01)
*H01H 13/7057* (2006.01)
*H01H 3/12* (2006.01)
*G06F 1/16* (2006.01)

(52) U.S. Cl.
CPC ....... *H01H 13/7057* (2013.01); *G06F 1/1662* (2013.01); *H01H 3/122* (2013.01)

(58) Field of Classification Search
CPC .. H01H 13/83; H01H 9/181; H01H 2219/016; H01H 2219/02; H01H 2219/024; H01H 13/7057; G06F 3/0238
See application file for complete search history.

(56) References Cited

U.S. PATENT DOCUMENTS

| | | | | |
|---|---|---|---|---|
| 4,897,651 | A  * | 1/1990 | DeMonte | G06F 1/22 341/22 |
| 10,592,004 | B1 * | 3/2020 | Sun | H01H 13/83 |
| 2005/0168421 | A1 * | 8/2005 | Hirose | G09G 3/3633 345/87 |
| 2013/0026017 | A1 * | 1/2013 | Verdú Martinez | H01H 13/04 200/307 |

FOREIGN PATENT DOCUMENTS

JP  3165415 U  * 1/2011 ........... H01H 13/023

* cited by examiner

*Primary Examiner* — Daniel J Colilla (57) ABSTRACT

A detachable screen key structure mainly includes a key body having a hollow portion, key butting element and screen carrying element, where a key signal connecter is configured in the hollow portion, the screen carrying element is configured with a display element and a key cap is configured on the display element, and the display element is configured with a display butting element adapted to dock the key butting element. Whereby, a user can accommodate the key signal connecter for signal transmission inside the hollow portion so as to increase use beautification. Furthermore, since the display will be connected to the key butting element through the display butting element, the user is allowed to carry out the removal and replacement by themselves, which can increase use convenience.

5 Claims, 10 Drawing Sheets

DETACHABLE SCREEN KEY STRUCTURE

(a) TECHNICAL FIELD OF THE INVENTION

The present invention relates to a detachable screen key structure, and more particularly to a detachable screen key structure more aesthetically pleasing in appearance and more convenient to use.

(b) DESCRIPTION OF THE PRIOR ART

Generally, the computer keyboard is one of the peripherals of the computer, a computer keyboard consists of a set of rectangular or nearly rectangular buttons or "keys". The top of the key is printed with characters. In most cases, pressing a button produces a corresponding symbol, such as letters, numbers or punctuation.

However, the characters shown on each key of general keyboard cannot be changed such that keys with a display screen are now available on the market, allowing users to adjust characters or patterns as needed.

However, the above keys with a display screen have the following disadvantages to be overcame:
1. a connecting line in connection with each key screen is exposed outside the key, affecting the overall appearance; and
2. the key screen cannot allow users to remove and replace it by themselves.

SUMMARY OF THE INVENTION

The main object of the present invention is to configure a key signal connecter inside a hollow portion, thereby increasing use beautification.

Another object of the present invention is to use the detachable effect of a key butting element and display butting element to allow a user to replace a display element by themselves.

To achieve the above objects, the present invention is to propose a detachable screen key structure, including: a key body, adapted to be in connection with a circuit board; a hollow portion, formed on the key body; a key butting element, configured on the key body; a key signal connecter, configured in the hollow portion, and two sides thereof respectively connected to the key butting element and circuit board; a screen carrying element, configured on the key body; a display element, configured on the key body; a display element, configured on the screen carrying element; a display butting element, configured on the display element, and adapted to dock the key butting element; and a key cap, configured on the display element and screen carrying element.

A user may install the key body on a circuit board, and the two ends of the key signal connector are respectively connected to the circuit board and key butting element. Upon use, the user may press the key cap to push the screen carrying element to press the key body, thereby allowing the key body to transmit this pressing signal to the circuit key board. At the same time, the signal will further be transmitted to the display element and displayed on it through the key signal connecter, key butting element and display butting element, thereby allowing the present invention to be used as a key having a display effect. Furthermore, because the key signal connecter for signal transmission is configured inside the hollow portion of the key body so that it will not be disposed outside, which can increase use beautification in appearance.

Since the display element is adapted to dock the key butting element through the display butting element, the display element can be directly removed and replaced with a new or another one when the display element is damaged or a user wants to replace it with a different one by themselves and docked on the key butting element through the display butting element, and it can then be directly used. Thus, a user is allowed to carry out the replacement by themselves to improve use convenience.

DETAILED DESCRIPTION OF THE PREFERRED EMBODIMENTS

Figure 1:
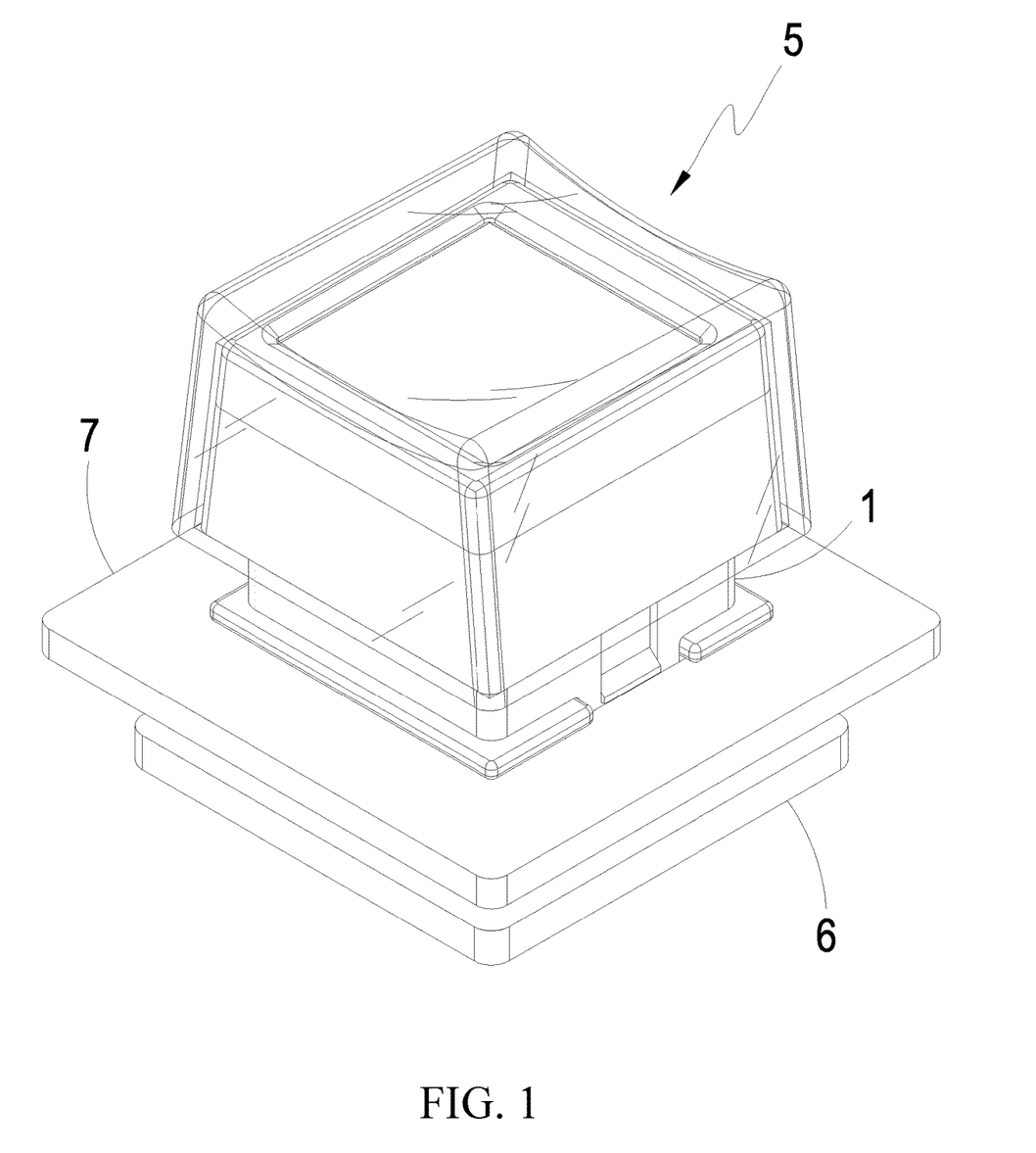
FIG. 1 is a perspective view of a preferred embodiment of the present invention.
Figure 2:
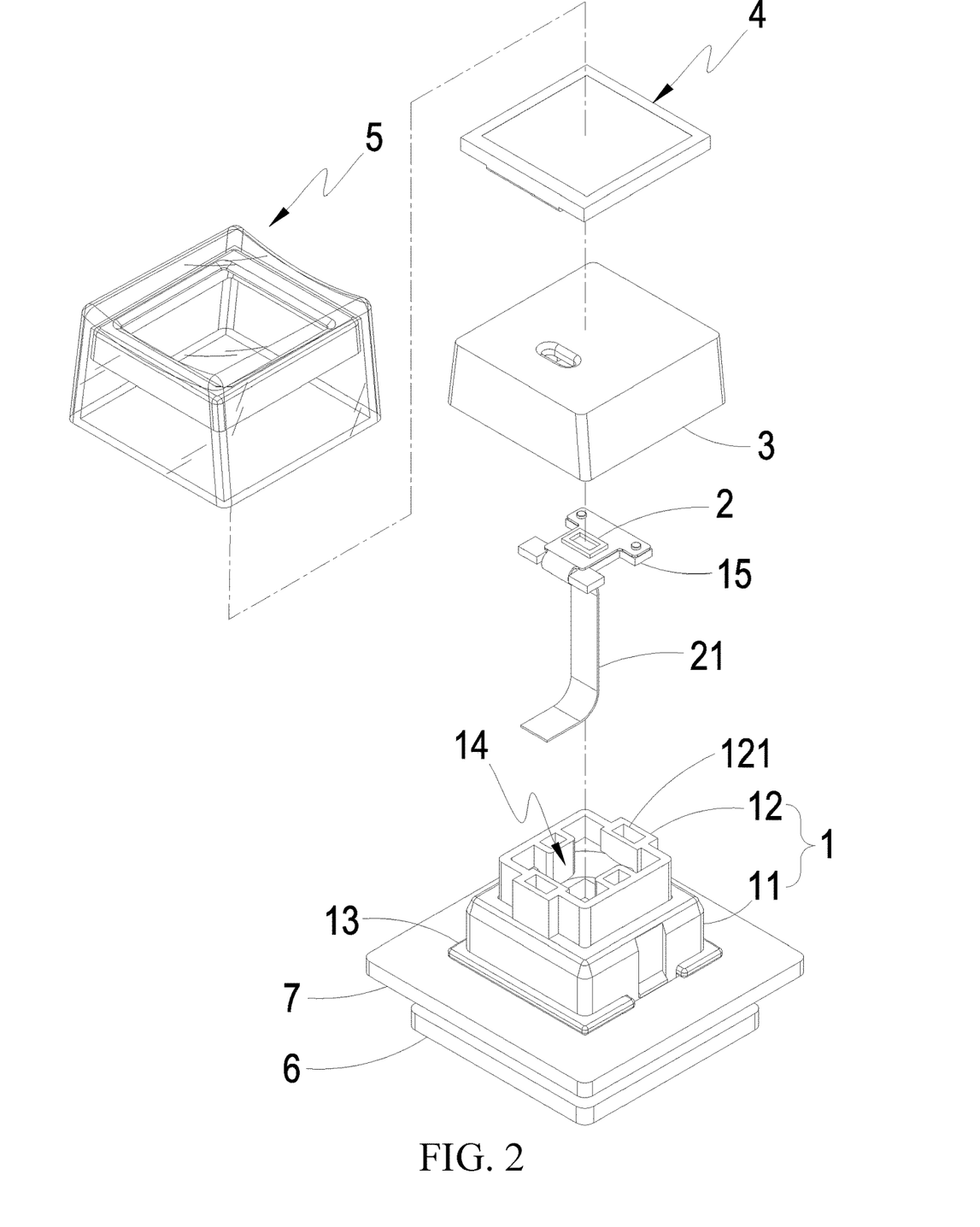
FIG. 2 is an exploded view of the embodiment of the present invention.
Figure 3:
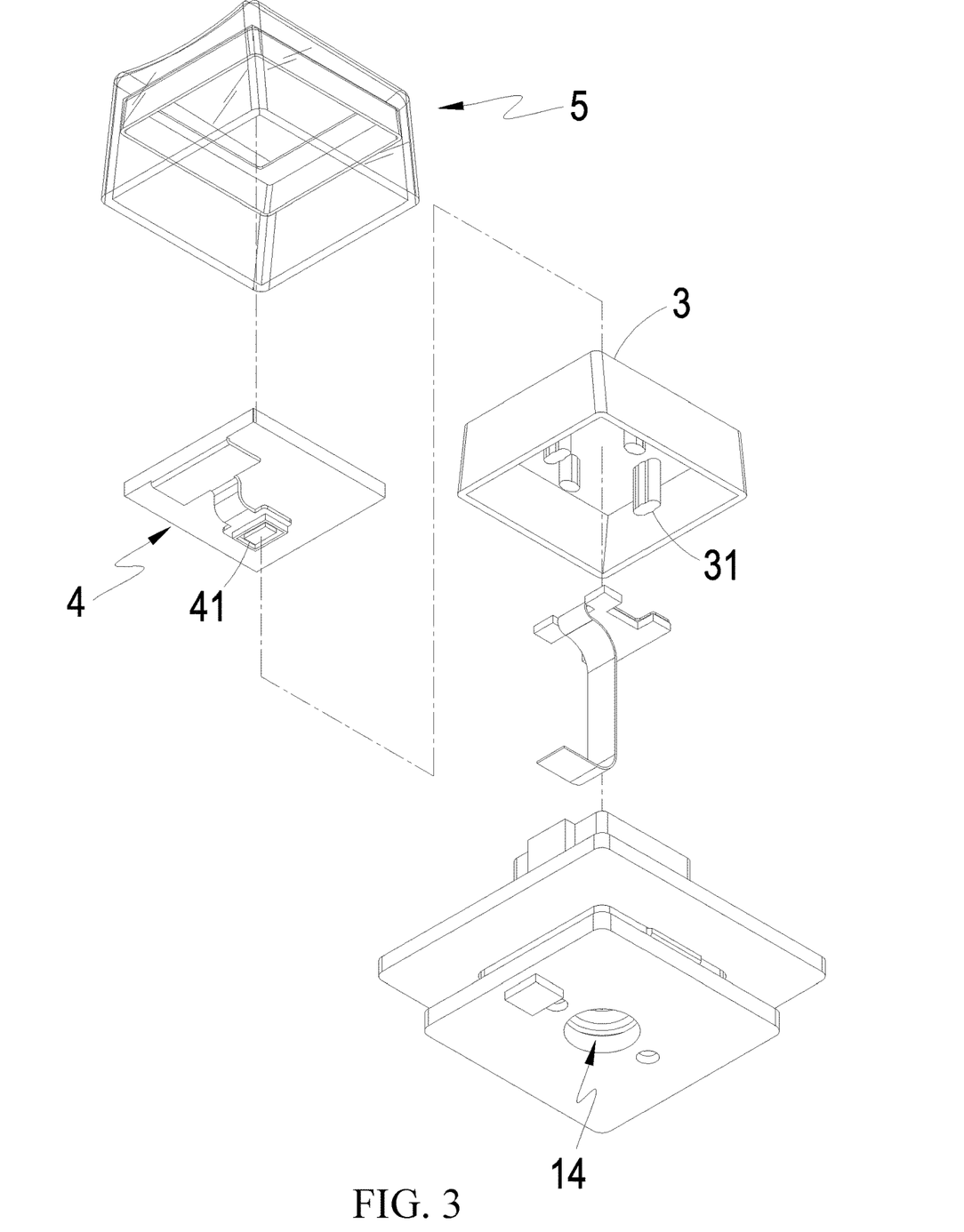
FIG. 3 is another exploded view of the embodiment of the present invention.

Referring to FIGS. 1 to 3, a detachable screen key structure of the present invention includes key body 1, abutting portion 13, hollow portion 14, press carrying element 15, key butting element 2, key signal connecter 21, screen carrying element 3, at least one carrier butting portion 31, at least one presser butting portion 121, a display element 4, display butting element 41 and key cap 5.

The key body 1, in a preferred embodiment, is exemplified as a mechanical key such that it will have an installation portion 11 and a pressing portion 12 movably configured on the installation portion 11, and the key body 1 is connected to a circuit board 6 and configured on a fixing plate 7.

The abutting portion 13 is formed on the key body 1 and adapted to assist the key body 1 to be in abutment against the fixing plate 7 and so positioned.

The hollow portion 14 is formed on the key body 1 and will simultaneously penetrate the pressing portion 12 and the installation portion 11.

The press carrying element 15 is configured on the pressing portion 12. In the embodiment, the press carrying element 15 is a carrier board placed on the pressing portion 12.

The key butting element 2 is configured on the key body 1. In the embodiment, the key abutting element 2 is a pluggable docking socket placed on the press carrying element 15.

The key signal connecter 21 is configured in the hollow portion 14. In the embodiment, the two ends of the key signal connecter 21 are respectively connected with the circuit board 6 and the soft circuit board of the key butting element 2.

The screen carrying element 3 is configured on the key body 1.

The carrier butting portions 31 are configured on the screen carrying element 3.

The presser butting portions 121 are configured on the pressing portion 12 and adapted to dock the presser butting portions 31. In the embodiment, the carrier butting portion 31 is a convex portion formed on the screen carrying element 3, and the presser butting portion 121 is a concave portion for the docking of the carrier butting portion 31.

The display element 4 is configured on the screen carrying element 3. In the embodiment, the display element 4 is exemplified as a display screen in connection with a soft circuit board.

The display butting element 41 is configured on the display element 4. In the embodiment, the display butting element 41 is a docking plug that can be docked on the key butting element 2.

The key cap 5 is configured on the display element 4 and screen carrying element 3, and has a light transmitting portion 53. In the embodiment, the entire main body of the keycap 5 is made transparent to indicate the light transmitting portion 53, but the present invention is not so limited.

Referring to FIGS. 1 to 7, the screen carrying element 3 is inserted in the presser butting portions 121 through the carrier butting portions 31, thereby placing the screen carrying element 3 on the pressing portion 12 of the key body 1. At the same time, the display butting element 41 and key butting element 2 will be docked with each other. Because the key butting element 12 is positioned on the presser carrying element 15, a user can instinctively align the key butting element 2 upon the assembly, which increases assembly convenience. Thereafter, the key cap 5 is placed on the display element 4 and screen carrying element 3, and the screen key of the present invention can then be used.

Figure 4:
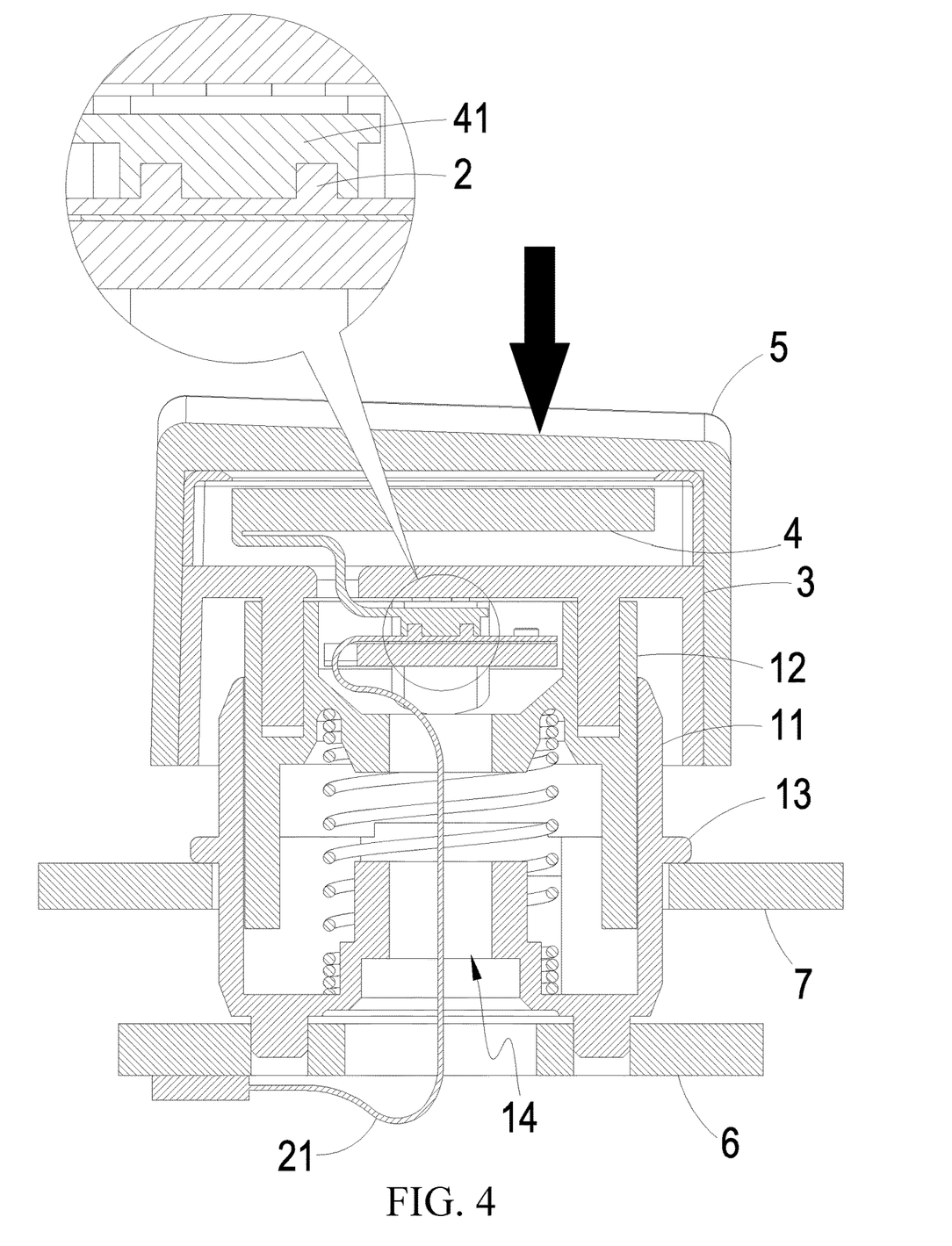
FIG. 4 is a schematic view of the embodiment of the present invention in a pressing state.
Figure 5:
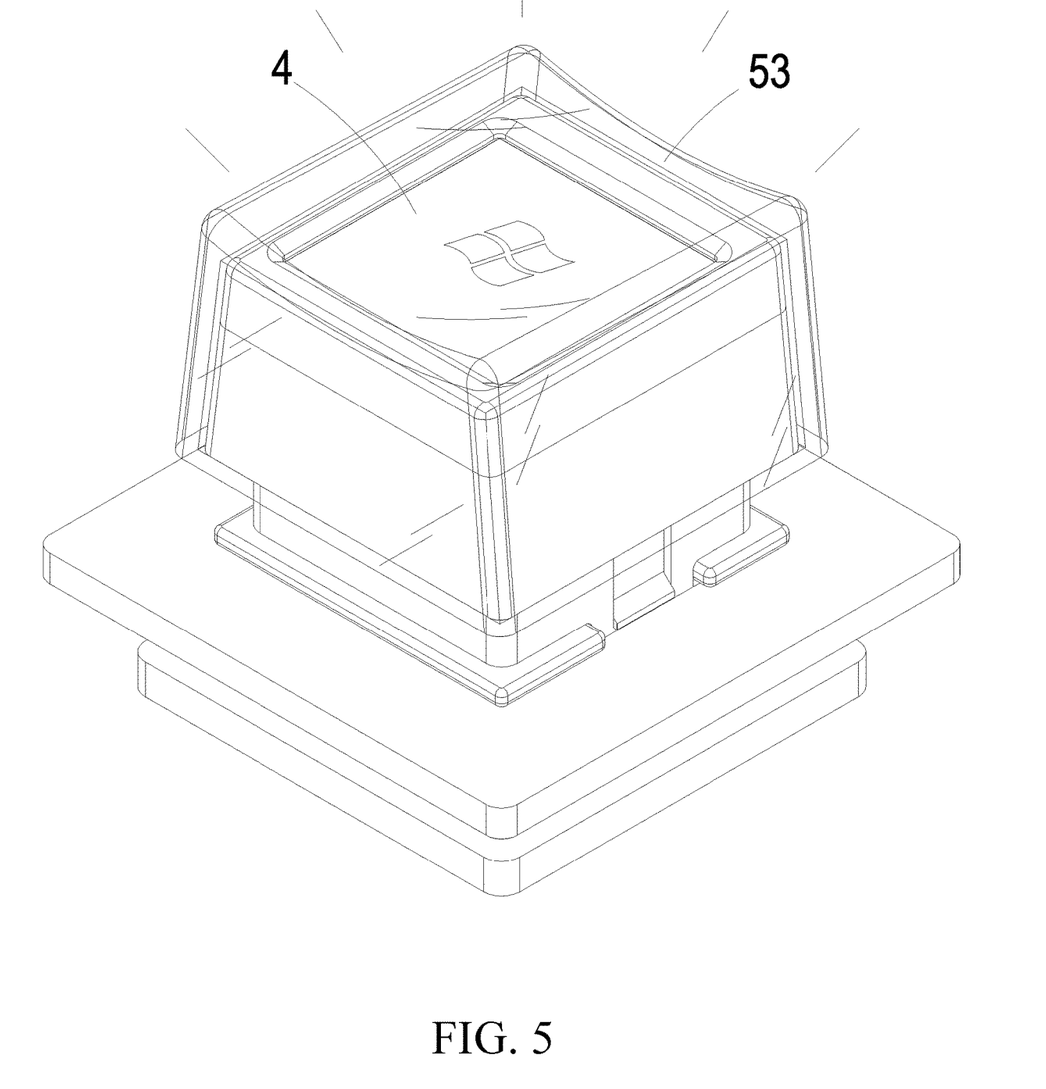
FIG. 5 is a schematic view of the embodiment of the present invention upon character displaying.

When a user press the key cap 5, the display carrying element 3 and pressing portion 12 will be pushed; when the key body 1 is subjected to the pressure, a signal will be transmitted to the circuit board 6 (since the installation portion 11 is limited to the fixing plate 7 through the abutting portion 13, it is also possible to prevent the direct application of the pressing force to the circuit board 6 to cause damage to the circuit board 6), the circuit board 6 will then transmit the signal to the display element 4 through the key signal connecter 21, key butting element 2 and display butting element 41 to display related content through the light-transmitting portion 53. Furthermore, because the key signal connecter 21 will be positioned inside the hollow portion 14 and not be exposed to the outside upon the pressing, a eye-appealing effect can be increased upon use, and the user will also not touch the key signal connecter 21, which can reduce the chance of damage.

Figure 6:
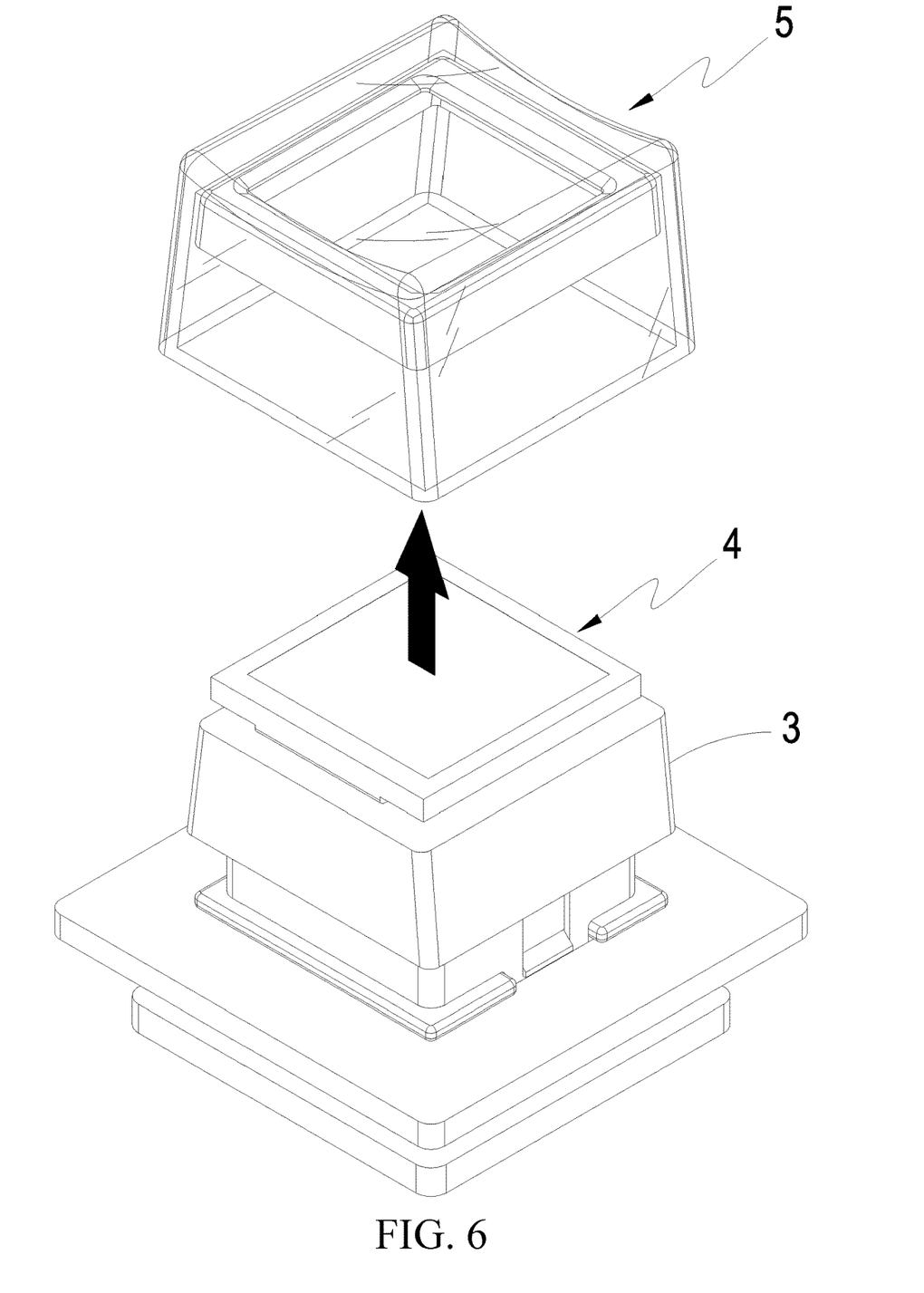
FIGS. 6 and 7 respectively show the embodiment of the present invention upon detachment and replacement.
Figure 7:
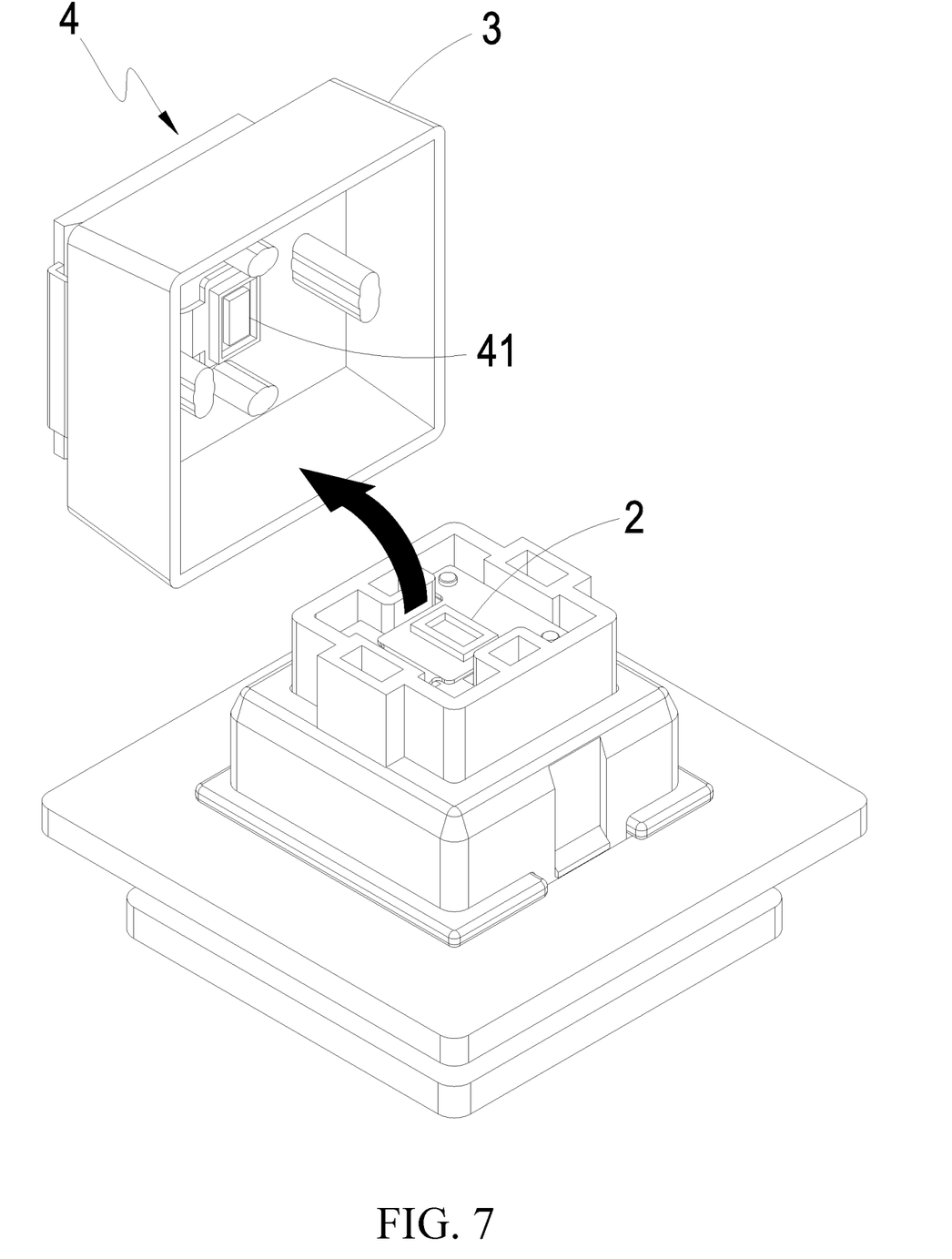

When the display element 4 is damaged or the replacement thereof is needed, the key cap 5 may first be taken down, the screen carrying element 3 is then removed, the display element 4 can then be driven to move, and the key butting element 2 is allowed to be separated from the display butting element 41, allowing a user to replace the display element 4 with a new one according to the requirements, which can increase the use convenience. furthermore, when the display element 4 is damaged, the entire screen key need not be discarded and the display element 4 can be replaced separately so that the cost can be reduced.

Figure 8:
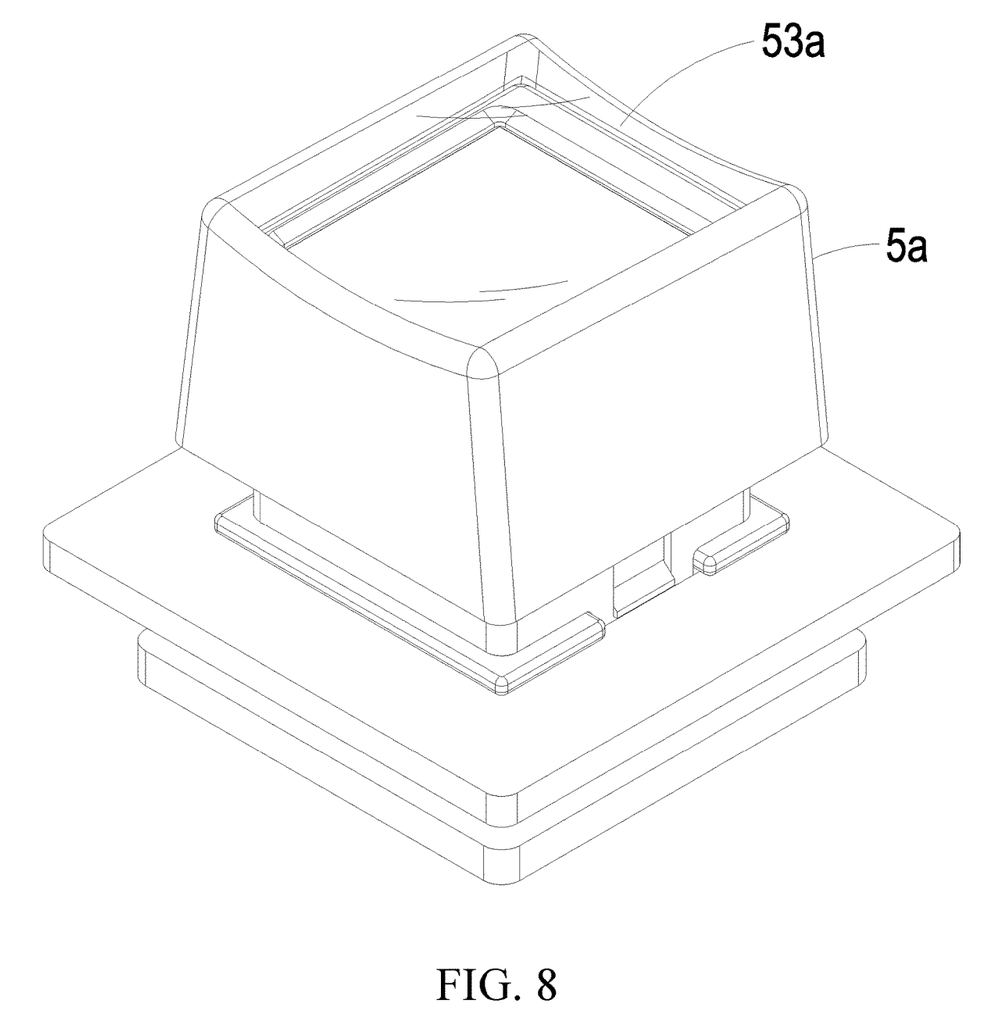
FIG. 8 is a perspective view of another preferred embodiment of the present invention.
Figure 9:
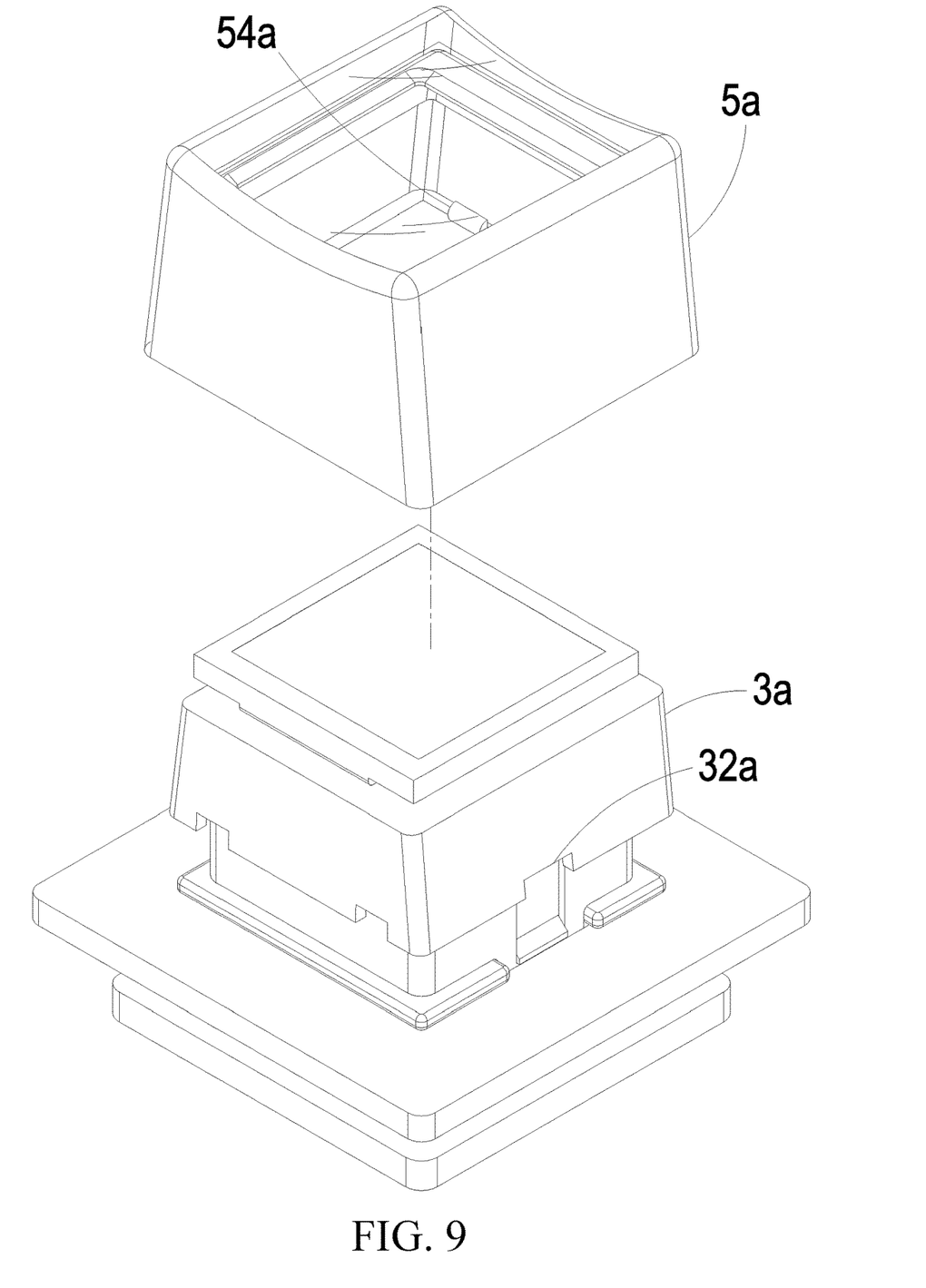
FIG. 9 is an exploded view of the embodiment of the present invention.
Figure 10:
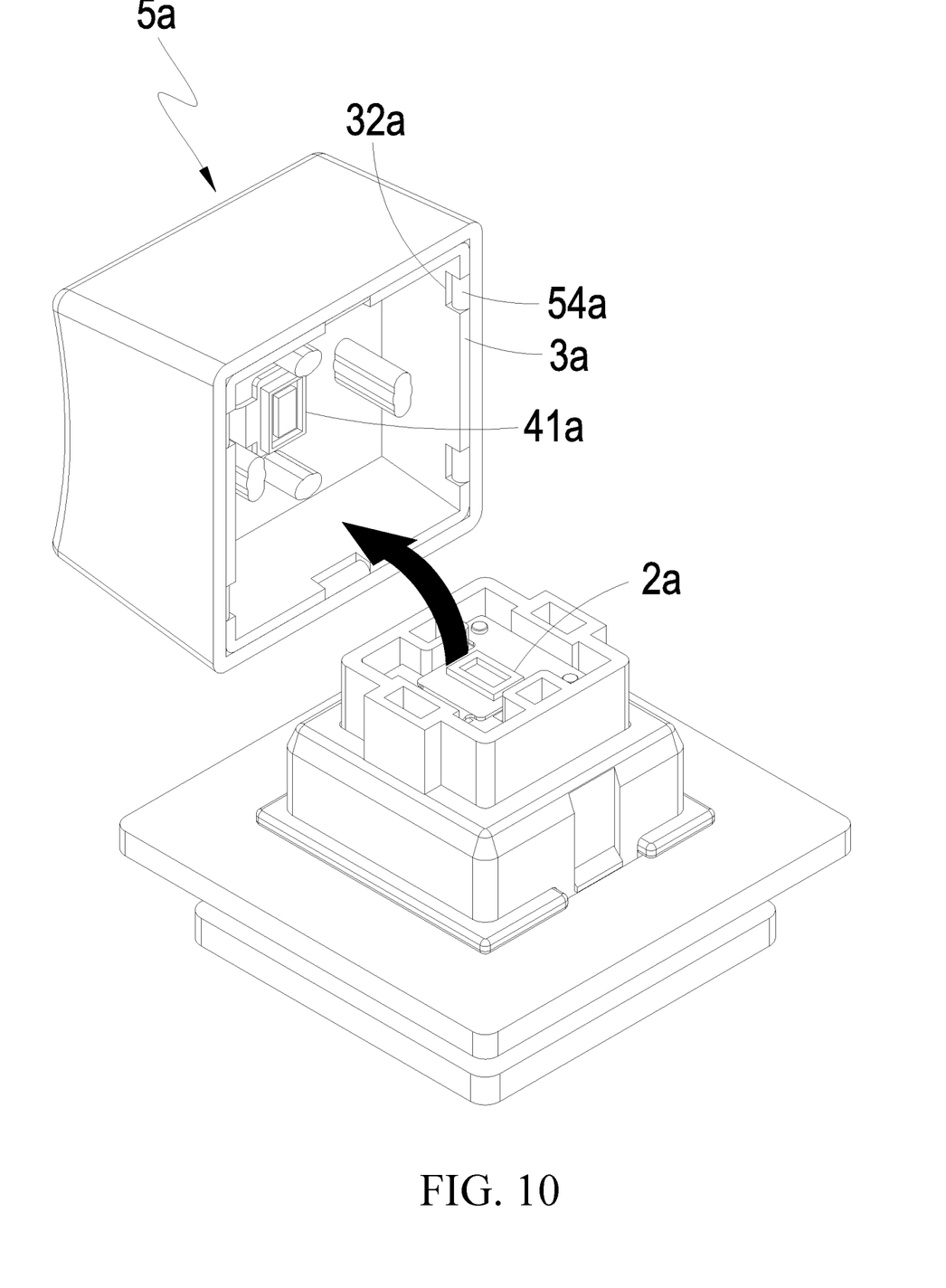
FIG. 10 shows the embodiment of the present invention upon detachment and replacement.

Referring to FIGS. 8 to 10, which show another preferred embodiment of the present invention, the present embodiment is almost similar to the above embodiment except that in the present embodiment, the light transmitting portion 53a is configured on an acrylic plate on the key cap 5a, thereby indicating that the aspect of the light transmitting portion 52a is not limited.

Furthermore, as illustrated in FIG. 9 which is an exploded view of the embodiment of FIG. 8, the key cap 5a is configured with a key cap connection portion 54a, and the screen carrying element 3a has at least one carrier connection portion 32a correspondingly connected to the key cap connection portion 54a, thereby directly connecting the key cap 5a to the screen carrying element 3a. Thus, a user can remove the key cap 5a to drive the screen carrying element 3a to move to cause the key butting element 2a to be separated from the display butting element 41a when the replacement is needed, which increases the efficiency of the removing and replacement.

I claim:

1. A detachable screen key structure, comprising:
   a key body, adapted to be in connection with a circuit board;
   a hollow portion, formed on said key body;
   a key butting element, located in said key body;
   a key signal connecter, configured in the hollow portion, and two ends thereof respectively connected to said key butting element and circuit board;
   a screen carrying element, configured on said key body;
   a display element, configured on said screen carrying element;
   a display butting element, configured on said display element, and adapted to dock said key butting element; and
   a key cap, configured on said display element and screen carrying element;
   wherein said key body has an installation portion, a pressing portion movably configured on said installation portion, wherein said pressing portion has a presser carrying element adapted to mount said key butting element.

2. The structure according to claim 1, wherein said key body is configure on a fixing plate and has an abutting portion adapted to limit said key body on said fixing plate.

3. The structure according to claim 1, wherein said key cap has at least one light transmitting portion.

4. The structure according to claim 1, wherein said screen butting element has at least one carrier butting portion, and said pressing portion has at least one presser butting portion adapted to dock said carrier butting portion.

5. The structure according to claim 1, wherein said key cap has a key cap connection portion adapted to be in connection with said screen carrying element.

* * * * *